July 1, 1969  J. S. SWEARINGEN  3,452,839
REDUCTION OF POWER LOSSES IN HIGH SPEED BEARING LUBRICATION
Filed Nov. 7, 1966
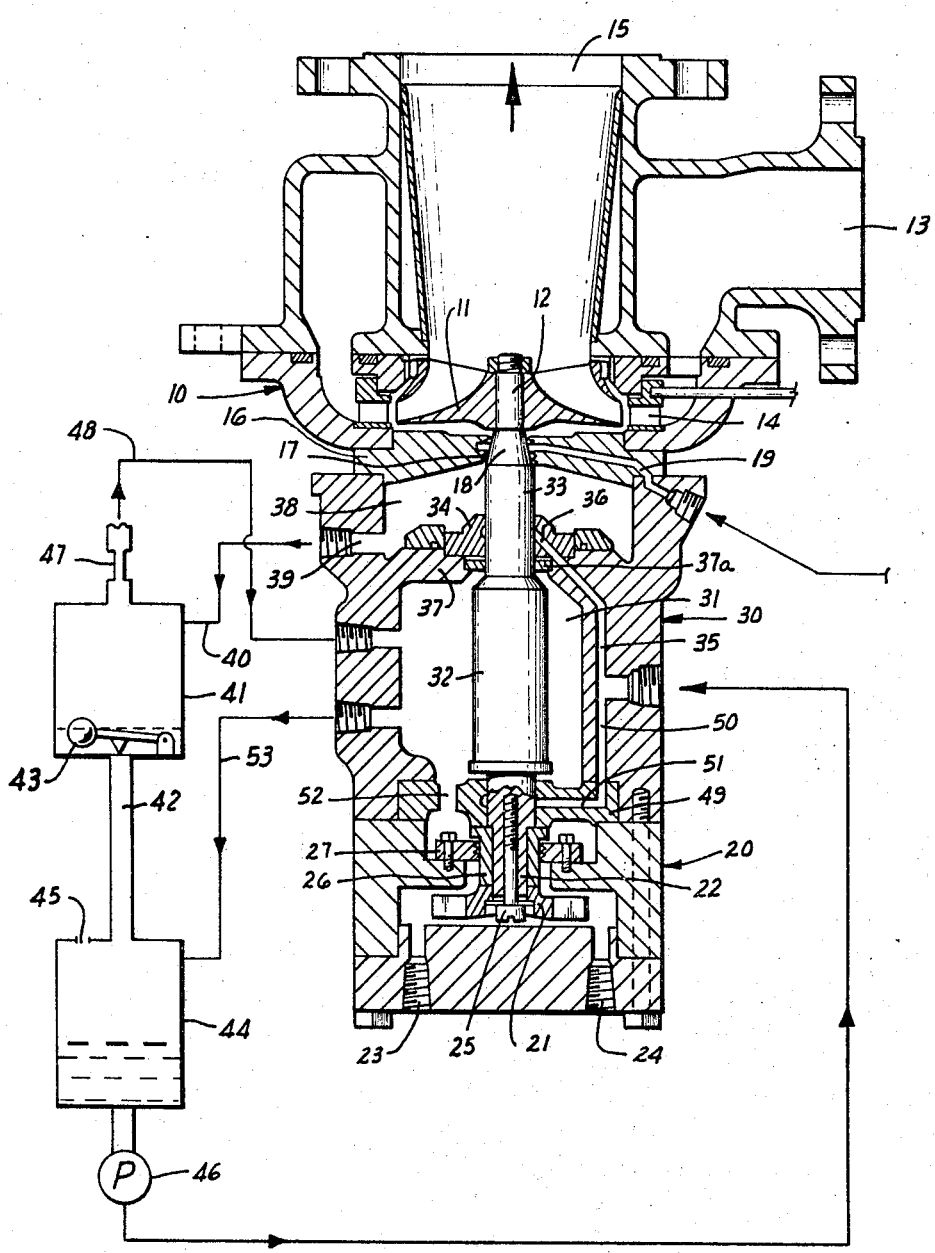
JUDSON S. SWEARINGEN
INVENTOR.
BY *Browning, Simms,*
*Hyer & Eickenroht*
ATTORNEYS

United States Patent Office 3,452,839
Patented July 1, 1969

3,452,839
REDUCTION OF POWER LOSSES IN HIGH
SPEED BEARING LUBRICATION
Judson S. Swearingen, 500 Bel Air Road,
Los Angeles, Calif. 90024
Filed Nov. 7, 1966, Ser. No. 592,659
Int. Cl. F01m 1/02; F16n 17/06; F16j 15/40
U.S. Cl. 184—6                                    8 Claims

ABSTRACT OF THE DISCLOSURE

A system in which a high speed shaft extends through one or more walls from a lower to a higher pressure space through clearance type seals and has a support bearing or bearings in the lower pressure space, the space between such seal and the adjacent bearing being enclosed to form a chamber and the bearing being provided with lubricant under pressure sufficient to flow from the bearing into the chamber and the seal with gas under pressure sufficient to flow into such chamber, and the chamber having an outlet adjacent its lower portion so that the gas will purge the chamber of lubricant and flow with it out of the chamber. A trap is provided for separating the lubricant and seal gas for reuse in the same and/or additional bearings and bearing chambers and, in the case of a bearing not having a seal using seal gas adjacent it, the gas may be injected directly into the upper portion of the bearing chamber. A plurality of bearings may empty lubricant into the same chamber and seal gas from one chamber may, after separation, be used in another.

Background of the invention

This invention relates to the lubrication of high speed bearings and more particularly to the reduction of power losses occurring in and in connection with the lubrication of such bearings.

High speed rotary shafts or spindles such as used in turboexpanders and other high speed rotary machines are very commonly mounted in sleeve type bearings and thrust bearings which are lubricated by being flooded with pressurized oil. The oil is characteristically injected under pressure intermediate the ends of such a bearing and caused to flow from its point of injection toward one or both ends of the bearing where it is expelled from the bearing. It is conventional to surround the shaft and bearing by a housing providing a chamber to catch the oil being expelled from the bearing or bearings and to have connected with such chamber or chambers a means for draining such oil back to a reservoir from which it may be drawn by a lubricant pump and reused. In many instances with such high speed shafts two or more of such bearings are used spaced from one another along an intermediate portion of the shaft with the power source such as a turbine toward one extremity of the shaft from such bearing and a power absorption device such as a compressor, turbulator or the like toward the other extremity of the shaft from the bearings. Between the bearings where the greatest stiffness of the shaft is required it is characteristically of larger diameter than the shaft where it extends through the journals or bearings.

The surface of a shaft operating at such high speeds, particularly along the large diameter portion just mentioned, may be moving several hundred feet per second, and oil which touches the shaft moving at such speed is accelerated to substantially the same speed and thereby becomes heated to the extent of several degrees rise in temperature. With a shaft operating at such high speed the oil is almost immediately after being so accelerated thrown off by centrifugal force and caused to impact against the wall of the bearing chamber surrounding the shaft. This causes the oil to become heated still further. If the oil is not promptly drained from the bearing case the above-described action is repeated again and again and the more oil that is retained in the bearing case, the more objectionable this action becomes. It produces not only power loss, but such excessive increases in temperature as to be highly objectionable. Machines operating at or above 50,000 r.p.m. have this trouble to an objectionable degree.

Furthermore, oil tends to collect even more in the bearing case or chamber if the oil drain from such chamber does not have a very good vent back into the bearing case, the oil during its turbulence in the bearing case further serving to emulsify with gas that is present in such case and to carry such gas out as a froth or emulsion to the reservoir, thereby leaving the case devoid of gas and filled with liquid. This is objectionable not only because of the heating effect described above, which would be aggravated by such an accumulation of oil, but also because the wetting of the shaft is irregular and the machine tends to have an irregular speed producing still more inefficiency.

Objects and summary of the invention

It is an object of this invention to reduce the losses and inefficiencies as well as the objectionable rises in temperature of bearings for such high speed shafts by causing the lubricant being expelled from such bearing or bearings to be promptly and constantly ejected from the bearing chamber after it emerges from the bearing.

It is a further object of this invention to avoid the necessity for large diameter bearing chambers which are sometimes employed as a means of reducing the turbulence therein and hence to make it possible to use less material and less over-all space for the bearing chamber.

Another object of this invention is to accomplish the above results by making maximum use of the systems such as seal systems many times employed when the high speed shafts in question form parts of machines handling material under pressure, such as turboexpanders and the like.

Illustrative embodiment of the invention

Other objects and advantages of this invention will become apparent from the following description taken in connection with the accompanying drawings wherein is set forth by way of illustration and example one embodiment of this invention.

In the single figure of the drawing there is shown, principally in longitudinal cross section along the axis of a machine employing a high speed shaft, and partly by diagrammatic illustration of equipment external to such machine, one embodiment of this invention.

The embodiment of the invention illustrated is in a vertical shaft machine, in which the problems above mentioned are most prevalent, although the invention could be employed in other types if found desirable.

Generally the objects of this invention are accomplished by the provision of a bearing chamber adapted to receive lubricant from a bearing in the usual manner with the chamber having means for draining lubricant therefrom at some point below its upper extremity, preferably toward its lower extremity, and means for injecting a gas under pressure into such chamber adjacent its upper extremity so that such gas will constantly force the lubricant expelled from the bearing into the chamber to drain out of the chamber toward the reservoir for which it is destined.

In applying this invention to machines such as turboexpanders in which it is necessary that the space around the turbine or the like be provided with a seal about the shaft at the zone where the shaft emerges from the chamber where the expander wheel is located, advantage is taken of the fact that such a seal may be of the labyrinth type with a seal gas being injected under pressure midway between the ends of the seal and caused to flow toward and be expelled from the external end of the seal. In such apparatus the gas is injected at a pressure at least as high as that of the gas within the turboexpander and ordinarily is expelled from the outer end of the seal still at a very substantial pressure. It is quite customary to limit the outflow of such gas from the outer end of the seal by utilizing an oil seal which may be a separate ring or a bearing on the shaft lubricated as above described as a retainer for the seal gas to prevent it from escaping or at least retard it so that it will not escape as fast as it might if allowed to escape directly to the atmosphere. Oil draining into the space between such first-mentioned seal and bearing will normally be drained therefrom into a float-operated drainer to retain the gas but discharge the oil to the reservoir for oil. The amount of gas it is desired to allow to flow out of the labyrinth seal explained above is permitted to eescape from the vapor space of the drainer, its flow being controlled by a valve or orifice. This seal gas may be vented to the atmosphere or otherwise treated as preferred. In cases in which the gas present in the turboexpander or other like machine is of a character which may be allowed to escape in small quantities, the injection of a seal gas under pressure may be omitted. In either case the gas emerging from the first-mentioned seal may be retained under some pressure by the means above described.

It is within the purview of this invention that such seal gas or other gas escaping from the seal under pressure may be introduced into the upper end of the chamber into which the lubricant is being expelled from the bearing or bearings, so as to force such lubricant by such pressure to flow out of such chamber toward the reservoir and prevent the accumulation of lubricant and hence the formation of excessive froth or emulsion of the lubricant within the bearing chamber.

The particular embodiment of this invention illustrated in the drawing which will now be described in greater detail includes a turboexpander on the upper end of a vertical shaft with a seal being formed about the shaft at the point it emerges from the expander by means of a labyrinth seal, which may be supplied with externally pressurized seal gas, and such seal gas as emerges from such seal along the shaft is employed as the means of purging the lubricant from the bearing chamber located at a lower point on the shaft.

In the drawing, the numeral 10 designates generally a machine of the character of a turboexpander having a rotating element or wheel 11 mounted for high speed rotation upon the upper end 12 of a high speed shaft. This wheel is located within a housing having a suitable inlet such as 13 for gas which is conducted from such inlet through turbine nozzles 14 into the turbine or expander wheel 11 and thence outwardly through the outlet 15.

The wall of the housing through which the shaft of the turboexpander extends is shown in the form of a block 16 having an opening 17 therethrough for embracing a preferably tapered portion 18 of the shaft to form therewith what is commonly known as a labyrinth type seal. In the case of turboexpanders it is common that they operate at very low temperatures and it is therefore frequently expedient that the block 16 be made of a material which will not readily transfer heat.

For the purpose of supplying a seal gas to the labyrinth type seal just mentioned, a suitable duct 19 may be provided leading from the exterior of the machine where it is supplied with seal gas under pressure from a suitable external source, to a point intermediate the ends of the labyrinth type seal, at which point the seal gas is injected into the seal under pressure as great as or greater than that existing within the turboexpander so as to cause it to be expelled against any suitable pressure maintained at the lower end of this seal.

On or connected to be driven by the opposite end of the shaft illustrated may be any suitable device adapted to absorb the power transmitted from the turboexpander through the shaft as illustrated at 20. Examples of suitable devices of this kind are devices absorbing power attached to or driven by the shaft or they may be of the type of a compressor. In either event, such device would employ a rotor 21 suitably secured to the lower end of the shaft at 22. Conveniently it may have an inlet 23 to the housing through which liquid or gas would be introduced into such device and an outlet 24 through which it would be withdrawn. The rotor 21 may be secured to the shaft in any suitable manner as by retaining screw 25. In order to provide for upward thrust to be taken by bearing 49 a flanged bushing 26 may be located around the shaft adjacent the rotor 21. A seal ring or washer 27 may surround bushing 26 in close embrace to seal the device 20 from such bearing and the bearing chamber 31.

In between the expander 10 and the device 20 which absorbs power transmitted by the shaft, the shaft is surrounded by a housing 30 providing a lubricant or bearing chamber 31 within the housing and surrounding the shaft. The portion of the shaft within this chamber will normally be of larger diameter as indicated at 32 compared with that at its ends, so as to provide the necessary stiffness for the transmission of power between the ends of the shaft.

The shaft toward its end carrying the turboexpander and at a suitable location such as 33 may be of somewhat smaller diameter than the intermediate section 32 and supported at such location by a bearing structure 34 surrounding the same. Lubricant may be supplied under pressure through a lubricant duct 35 and an auxiliary duct 36 through the bearing structure 34 to a point intermediate the ends of this bearing, such lubricant being preferably supplied under such pressure that it will be forced to emerge from both ends of the bearing, and at least upwardly into the space into which the seal gas from the labyrinth type seal 17 emerges downwardly from such seal and against the pressure of such gas. The bearing 34 is preferably mounted on and forms a part of a partition 37 which surrounds the shaft. It may provide a seal around the shaft or a separate seal ring 37a may be employed below the bearing in the partition 37 in position to be wetted by lubricant from such bearing to maintain a back pressure against the expulsion of the seal gas from the labyrinth seal 17. The chamber 38 between the labyrinth seal 17 and the partition 37 is thus maintained under some pressure which is low enough to permit the escape of seal gas at a restricted rate from the labyrinth seal 17 and thus prevent the entry of lubricant, as from bearing 34, into such seal and eventually into the turboexpander.

The lubricant and seal gas thus flowing into the chamber 38 will be forced by the seal gas flowing into such chamber to emerge from the lower end thereof through the outlet 39 and from this outlet will be conducted, still under the pressure existing in the chamber 38, through a line 40 to a suitable trap or drainer 41 in the form of a pressure reservoir. Lubricant thus accumulating in the drainer 41 will be drawn off as it accumulates through a drain line 42, this drainage being controlled by a float operated valve 43 which will permit the outflow of lubricant only when the level of lubricant in the drainer 41 rises to a predetermined point.

The lubricant so drained from the drainer 41 through the float valve 43 will enter the reservoir 44 which may be maintained at atmospheric pressure by means of a vent 45 in its upper end. Lubricant may be drawn from this reservoir 44 by any suitable means such as a pump 46 for recirculation to the bearing or bearings.

Thus it will be seen that the seal gas emerging from the labyrinth seal 17 serves to keep the chamber 38 swept clear of any accumulation of lubricant therein and maintain it nearly full of gas under some pressure at all times. The gas flowing from this chamber into the drainer 41 will be allowed to emerge from the drainer 41 through a suitable restriction or orifice 47 from which it will flow through a line 48 into the uppermost portion of the chamber 31, the orifice 47 being such as to maintain the desired pressure on the chamber 38 and still to permit the gas to be discharged through the line 48 into the upper end of the chamber 31 under sufficient pressure to constantly sweep the chamber 31 substantially clear of lubricant. The lubricant in chamber 31 will include that expelled downwardly from the bearing 34 if the seal 37a is not used, and also in any event that escaping upwardly from a lower journal and thrust bearing 49 spaced below the bearing 34 and the enlarged intermediate portion 32 of the shaft. Bearing 49, intermediate its ends, is supplied with lubricant under pressure through passageways 50 and 51 which may be from the same source as lubricant to bearing 34. A portion of this lubricant is expelled into the bearing chamber 31 and will be forced out of the chamber 31 through the line 53 into the reservoir 44 from whence it will be drawn to be reused in the manner above mentioned. Lubricant from the lower end of bearing 49 may be allowed to enter chamber 31 by provision of an opening 52 through the bearing body. Gas escaping with such lubricant from the chamber 31 through the line 53 may be vented through the vent 45 from the reservoir 44 or handled in any other desired manner. Normally, however, such gas is of such a nature and so small in quantity that it may be economically vented to the atmosphere.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. In a high speed rotary machine having a rotary shaft, a support bearing about said shaft intermediate its ends, means for injecting a liquid lubricant into the bearing intermediate the bearing ends under pressure higher than the expected pressure at either end of the bearing in use, whereby lubricant will be expelled from the bearing at least at one end thereof, means providing an enclosed chamber about said shaft adjacent said one end of said bearing to catch the lubricant expelled from that end of the bearing, and means providing a passageway from said chamber below the upper extremity thereof to drain lubricant therefrom, the combination therewith of means for injecting gas into said chamber above said passageway under pressure sufficient to force lubricant from the upper portion of said chamber out through said passageway.

2. The combination set forth in claim 1 in which the means for injecting gas into said chamber includes a labyrinth type seal about said shaft spaced from said bearing, and means for injecting a seal gas into said seal under pressure higher than the expected pressure at one end of said seal whereby seal gas will be expelled from said one end of said seal, and said end of said seal is in communication with said chamber above said passageway.

3. The combination set forth in claim 2 in which there are two of such chambers, one on either end of said bearing, and there is a means for conducting said gas from a lower portion of the chamber at the end of the bearing adjacent the seal into an upper portion of the chamber at the opposite end of the bearing, whereby the gas expelled from said seal will force lubricant from both of said chambers.

4. The combination set forth in claim 3 in which there is a liquid trap between said chambers for removing lubricant forced from the first chamber from the gas flowing to the second chamber.

5. The combination set forth in claim 3 in which there is a pressure reducing restriction in the communication between said chambers for maintaining the gas in said first chamber at a higher pressure than the gas in said second chamber.

6. The combination set forth in claim 1 in which there are two of such chambers, a plurality of bearings spaced apart and means for injecting lubricant into each bearing intermediate its ends, and in which each bearing has an end exposed into and from which lubricant is expelled into one of said chambers, and said shaft has a zone between said bearings exposed to the interior of one of said chambers.

7. In combination with a turboexpander operating on pressurized gas and having a rotary shaft extending therefrom, a housing rigidly joined to said turboexpander and surrounding and enclosing a portion of said shaft exteriorly of said expander, the interior of said housing having a partition and a bearing carried thereby closely embracing said shaft and forming a seal gas chamber most closely adjacent said expander and a bearing chamber more remote therefrom, a labyrinth type seal closing said expander about said shaft at the point of emergence of said shaft therefrom, means for injecting a seal gas under pressure into said seal intermediate the ends thereof at a pressure at least as high as the expected pressure of the pressurized gas within said expander whereby seal gas will be continuously expelled into said seal gas chamber, there being a second bearing in said bearing chamber spaced from the said first-mentioned bearing, means for injecting liquid lubricant under pressure greater than that expected in the seal gas chamber into said bearings intermediate the ends thereof respectively whereby liquid lubricant will be expelled from said first-mentioned bearing into said seal gas chamber and from said second-mentioned bearing into said bearing chamber, said bearing chamber having an opening therefrom for draining lubricant to a lubricant reservoir, and means for withdrawing gas from said seal gas chamber and injecting it into said bearing chamber including a restriction for maintaining a pressure differential between said seal chamber and said bearing chamber, whereby lubricant will be expelled from said bearing chamber through the opening therefrom.

8. The combination set forth in claim 7 in which a float operated enclosed drainer is included in the means for conducting seal gas from said seal chamber to said bearing chamber, whereby lubricant entrained in said seal gas will be separated therefrom before it enters said bearing chamber.

References Cited

UNITED STATES PATENTS 1,759,074   5/1930   Van Rijswijk _____ 277—3

HOUSTON S. BELL, JR., *Primary Examiner.*

U.S. Cl. X.R.

62—193; 277—3, 15; 308—36.3